United States Patent [19]

Klecka

[11] Patent Number: 5,578,210

[45] Date of Patent: Nov. 26, 1996

[54] METHOD FOR STIMULATING ANAEROBIC BIOTRANSFORMATION OF HALOGENATED HYDROCARBONS

[75] Inventor: Gary M. Klecka, Midland, Mich.

[73] Assignee: The Dow Chemical Company, Midland, Mich.

[21] Appl. No.: 340,501

[22] Filed: Nov. 15, 1994

[51] Int. Cl.$^6$ .................................................. C02F 3/28
[52] U.S. Cl. ...................... 210/610; 210/747; 435/262.5
[58] Field of Search ................................... 210/605, 610,
210/611, 630, 631, 747; 435/262, 262.5, 264

[56] References Cited

U.S. PATENT DOCUMENTS

| | | | |
|---|---|---|---|
| 3,796,637 | 3/1974 | Fusey | 195/100 |
| 3,846,290 | 11/1974 | Raymond | 201/610 |
| 3,979,283 | 7/1976 | Prudom | 210/611 |
| 4,401,569 | 8/1983 | Jhaveri et al. | 210/747 |
| 4,588,506 | 5/1986 | Raymond et al. | 210/606 |
| 4,664,805 | 5/1987 | Focht et al. | 210/611 |
| 4,713,340 | 12/1987 | Crawford | 210/611 |
| 4,713,343 | 12/1987 | Wilson, Jr. et al. | 435/264 |
| 4,715,965 | 12/1987 | Sigerson et al. | 210/800 |
| 4,749,491 | 6/1988 | Lawes et al. | 210/610 |
| 4,756,831 | 7/1988 | Menzel et al. | 210/617 |
| 4,832,122 | 5/1989 | Corey et al. | 166/266 |
| 4,835,334 | 8/1989 | Vandenbergh et al. | 435/262 |
| 4,849,360 | 7/1989 | Norris et al. | 435/264 |
| 4,877,736 | 10/1989 | Fliermans | 435/183 |
| 4,925,802 | 5/1990 | Nelson et al. | 435/262 |
| 4,945,988 | 8/1990 | Payne et al. | 166/266 |
| 4,954,258 | 9/1990 | Little | 210/611 |
| 4,988,443 | 1/1991 | Michaels et al. | 210/611 |
| 5,006,250 | 4/1991 | Hegeman et al. | 210/610 |
| 5,008,019 | 4/1991 | Trost | 210/747 |
| 5,024,949 | 6/1991 | Roberts et al. | 435/262 |
| 5,057,221 | 10/1991 | Bryant et al. | 210/610 |
| 5,059,252 | 10/1991 | Renfro, Jr. | 134/7 |
| 5,062,956 | 11/1991 | Lupton et al. | 210/611 |
| 5,132,224 | 7/1992 | Mueller et al. | 435/262 |
| 5,178,491 | 1/1993 | Graves et al. | 405/128 |
| 5,196,121 | 3/1993 | Moore et al. | 210/603 |

(List continued on next page.)

FOREIGN PATENT DOCUMENTS 0429137  11/1990  European Pat. Off. .
0456607  4/1991  European Pat. Off. .

OTHER PUBLICATIONS

Semprini, L., et al. "In–Situ Transformation of Carbon Tetrachloride and Other Halogenated Compounds Resulting from Biostimulation under Anoxic Conditions", *Environ. Sci. Tech.*, 1992, 26, pp. 2454–2461.

Bennett, G. F., et al. "Microorganisms get to work", *Chemistry in Britain*, Feb. 1992, pp. 133–137.

Dolfing, J., et al. "Acetate as a source of reducing equivalents in the reductive dechlorination of 2,5–dichlorobenzoate", *Arch Microbiol*, 1991, 156 pp. 356–361.

Freedman, D. L., "Biological Reductive Dechlorination of Tetrachloroethylene and Trichloroethylene to Ethylene under Methanogenic Conditions", *Appl. Envir. Micro.*, Sep., 1989, pp. 2144–2151.

Fathepure, B. Z., "Dependence of Tetrachloroethylene Dechlorination of Methanogenic Substrate Consumption of Methanosarcina sp. Strain DCM", *Appl. Envir. Micro.*, Dec. 1988, pp. 2976–2980.

Fathepure, B. Z., et al. "Reductive dechlorination of perchloroethylene and the role of methanogens", *FEMS Microbiology Letters*, 1988, 49, pp. 149–156.

(List continued on next page.)

*Primary Examiner*—Christopher Upton
*Attorney, Agent, or Firm*—Timothy S. Stevens; Duane C. Ulmer; Noreen D. Warrick

[57] ABSTRACT

Adding at least one biotransformation enhancing agent selected from the group consisting of propylene glycol, glycerol, glutamate, a mixture of proteose peptone, beef extract, yeast extract, malt extract, dextrose and ascorbic acid and, and mixtures thereof to halogenated hydrocarbon contaminated soil and/or water.

9 Claims, 4 Drawing Sheets

U.S. PATENT DOCUMENTS

| | | | |
|---|---|---|---|
| 5,207,912 | 5/1993 | Winter et al. | 210/604 |
| 5,209,851 | 5/1993 | Hume et al. | 210/610 |
| 5,221,159 | 6/1993 | Billings et al. | 405/128 |
| 5,227,069 | 7/1993 | Van Dort et al. | 210/610 |
| 5,242,825 | 9/1993 | Mueller et al. | 435/253.3 |
| 5,246,584 | 9/1993 | Donaldson et al. | 210/603 |
| 5,277,518 | 1/1994 | Billings et al. | 405/128 |
| 5,277,815 | 1/1994 | Beeman | 210/605 |
| 5,279,740 | 1/1994 | Basile et al. | 210/610 |
| 5,286,140 | 2/1994 | Mather | 405/128 |
| 5,300,227 | 4/1994 | Varadaraj et al. | 210/610 |
| 5,302,287 | 4/1994 | Losack | 210/612 |
| 5,324,433 | 6/1994 | Grant et al. | 210/634 |
| 5,342,524 | 8/1994 | Gaddy | 210/610 |
| 5,342,525 | 8/1994 | Rowsell | 210/611 |
| 5,342,769 | 8/1994 | Hunter et al. | 435/166 |
| 5,384,048 | 1/1995 | Hazen et al. | 210/605 |

OTHER PUBLICATIONS

Bouwer, E. J., et al. "Removal of Trace Chlorinated Organic Compounds by Activated Carbon and Fixed–Film Bacteria", *Environ. Sci. Technol.*, vol. 16, Nov. 12, 1982, pp. 836–843.

Fathepure, B. Z., et al. "Complete Degradation of Polychlorinated Hydrocarbons by a Two–Stage Biofilm Reactor", *Applied. and Environ. Microbiolog*, Dec. 1991, pp. 3418–3422.

Bouwer, E. J., et al. "Transformation of 1–and 2–Carbon Halogenated Aliphatic Organic Compounds Under Methanogenic Conditions", *Applied. and Environ. Microbiolog.*, Apr., 1983 pp. 1286–1294.

DeBurin, W. P., et al. "Complete Biological Reductive Transformation of Tetrachloroethene to to Ethane", *Applied and Environ. Microbiolog.*, Jun. 1992, pp. 1996–2000.

Sims, J. L., et al. "EPA Ground Water Issue", *EPA/540/4–90/054*, Jan. 1991.

"Remediation of Sites Contaminated with TCE", *US Environmental Research Laboratory ADA OK*, 1991 (PB91–182311).

Vogel, T. M. "Transformations of halogenated aliphatic compounds" *Environ. Sci. Tech.*, vol., 21, No. 8, 1987, pp. 722–736.

Gibson, S. A., et al. "Stimulation of Reductive Dechlorination of Tetrachloroethene in Anaerobic Aquifer Microcosms by Addition of Short–Chain Organic Acids or Alcohols", *Applied, & Envir. Micro. Apr.* 1992, pp. 1392–1393.

ial or water, the limited rate of biotransformation associated with currently known nutrients may render such bioremediation processes impracticable or commercially undesirable. Thus, there is a need for a method of stimulating biotransformation which has a higher rate of conversion than currently known processes.

METHOD FOR STIMULATING ANAEROBIC BIOTRANSFORMATION OF HALOGENATED HYDROCARBONS

BACKGROUND OF THE INVENTION

This invention relates to methods for enhancing the biotransformation of halogenated hydrocarbons and more particularly of chlorinated aliphatic hydrocarbons. This invention has direct application to both the in situ and ex situ bioremediation of contaminated soil, sediment and ground water.

Organic contaminants in soil, sediment and ground water may be biotransformed or broken down by naturally occurring microorganisms. Highly chlorinated aliphatic hydrocarbons may be biotransformed to lower chlorinated homologs by a process known as reductive dehalogenation. It has been found that such biotransformation of chlorinated aliphatic hydrocarbons proceeds best in an anaerobic environment as opposed to an aerobic environment, see Vogel et al., Environmental Science and Technology, Vol. 21, 722 (1987).

Of the highly chlorinated aliphatic contaminants, chlorinated ethylenes are among the most common. Compounds such as perchloroethylene and trichloroethylene have been used extensively as industrial degreasing solvents, dry cleaning fluids, fumigants and in a variety of other applications. In view of their widespread use these compounds have been found as contaminants in soil, sediment and ground water. Since perchloroethylene and trichloroethylene have relatively moderate water solubilities, such compounds are mobile in soils, sediments and ground water.

It is known that the addition of certain organic nutrients such as acetate and methanol stimulate the anaerobic biotransformation of chlorinated aliphatic compounds by various microorganisms, see Gibson et al., Applied and Environmental Microbiology, Vol. 58, 1392 (1992). Such stimulated biotransformation has been applied in bioremediation processes to reduce contamination of soil and ground water by converting highly chlorinated aliphatic hydrocarbons to their lower homologs, See U.S. Pat. No. 5,277,815. Research indicates that anaerobic processes reduce the degree of halogenation and produce compounds that are then more susceptible to further microbial attack by aerobic microorganisms.

However, currently known nutrients achieve only a limited degree of biotransformation. That is, the conversion of highly chlorinated aliphatic hydrocarbons such as perchloroethylene and trichloroethylene to their ultimate lower homolog, ethylene, is limited. Instead of complete or near complete conversion in a desirable period of time, currently known nutrients in conjunction with suitable microorganisms, are able to effect only partial conversion, thereby leaving intermediate homologs such as dichloroethylene and/or vinyl chloride in the contaminated soil or water undergoing treatment. Thus, there is a need for a method of enhancing the extent of biotransformation of highly chlorinated aliphatic hydrocarbons which results in a greater degree of conversion to lower homologs, most preferably ethylene, than currently known methods.

In addition to the extent of biotransformation which occurs, another factor important to the attractiveness of a bioremediation process is the rate at which biotransformation occurs. The rate of biotransformation using currently known nutrients is limited, and it is desirable to obtain higher rates of biotransformation. When planning or attempting to bioremediate large volumes of contaminated soil or water, the limited rate of biotransformation associated with currently known nutrients may render such bioremediation processes impracticable or commercially undesirable. Thus, there is a need for a method of stimulating biotransformation which has a higher rate of conversion than currently known processes.

SUMMARY OF THE INVENTION

A primary benefit of this invention is a solution to the above mentioned problems. In one embodiment this invention is a method for enhancing the anaerobic biotransformation of at least one halogenated organic compound in an aqueous soil environment through stimulation of naturally occurring anaerobic bacteria in the environment by adding an agent selected from the group consisting of (a) propylene glycol, (b) glycerol, (c) glutamate, (d) a mixture of proteose peptone, beef extract, yeast extract, malt extract, dextrose and ascorbic acid and (e) mixtures of (a)–(d) in any combination thereof to at least a portion of the environment to produce an environment treated with the agent.

In another embodiment this invention is a method for enhancing the anaerobic biotransformation of at least one halogenated organic compound in water from an aqueous soil environment through stimulation of bacteria which includes two steps. The first step is to add an agent selected from the group consisting of (i) propylene glycol, (ii) glycerol, (iii) glutamate, (iv) a mixture of proteose peptone, beef extract, yeast extract, malt extract, dextrose and ascorbic acid and (v) mixtures of (i)–(iv) in any combination thereof to the water to produce enriched water. The second step is to contact the enriched water with a bacteria capable of biotransforming the halogenated organic compound to produce a treated water.

DETAILED DESCRIPTION OF THE INVENTION

Figure 1:
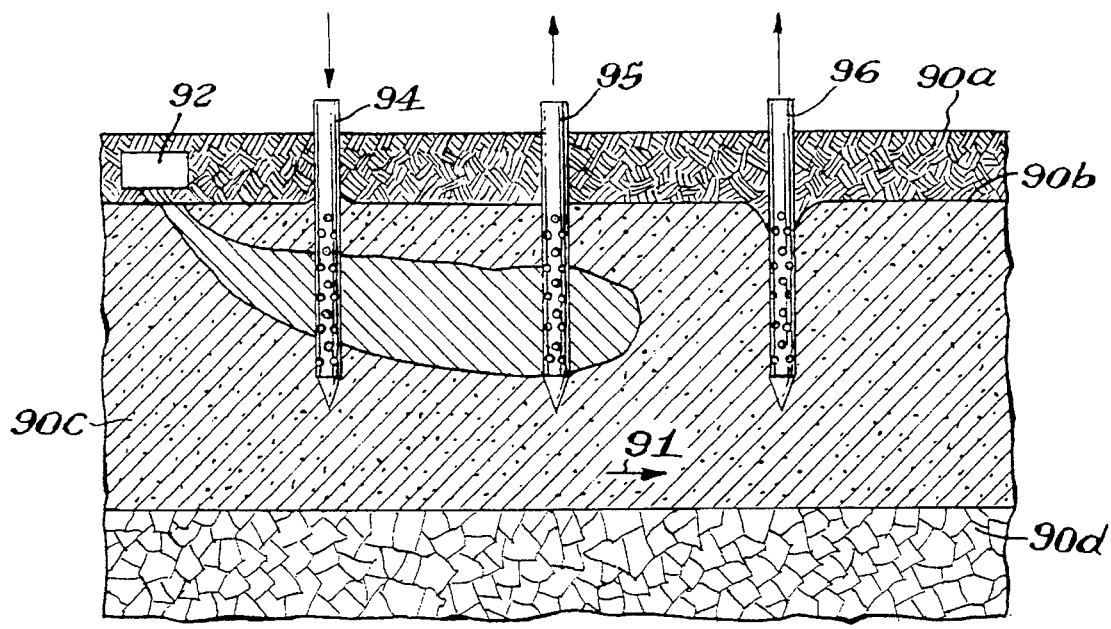
FIG. 1 shows a cross section of ground contaminated with a halogenated organic compound in the form of an aqueous subsurface plume which is being bioremediated by adding the agent to the plume according to one application of this invention.

In this invention, both the extent and rate of anaerobic biotransformation of halogenated organic compounds are enhanced by the addition of propylene glycol, glycerol, glutamate, a mixture of proteose peptone, beef extract, yeast extract, malt extract, dextrose and ascorbic acid, or mixtures thereof to contaminated soil, sediments and ground water. A mixture of proteose peptone, beef extract, yeast extract, malt extract, dextrose and ascorbic acid is available from Difco Laboratories of Detroit, Mich. under the trade name AC Broth. AC Broth is an anaerobic bacterial growth medium containing the following ingredients per liter of water: twenty grams of proteose peptone; three grams of beef extract; three grams of yeast extract; three grams of malt extract; five grams of dextrose; and two tenths gram of ascorbic acid.

The term "anaerobic biotransformation of a halogenated organic compound" means a biological reduction in the number of chlorine atoms covalently bound to the organic compound. For example, perchloroethylene can be biotransformed to trichloroethylene which can be biotransformed to dichloroethylene which can be biotransformed to vinyl chloride which can be biotransformed to ethylene. If the rate of biotransformation is increased by adding an agent to the aqueous soil environment or water from the aqueous environment, then the biotransformation is enhanced.

The term "aqueous soil environment" means the granular solid upper layers of the earth supported by bedrock, whether in place or excavated from the earth, which are saturated with water. A quantity of soil taken from below the water table is an example of an aqueous soil environment. A quantity of sediment taken from a waterway is an example of an aqueous soil environment. A quantity of soil left in place in the earth below the water table is an example of an aqueous soil environment. A quantity of sediment left in place in a waterway is an example of an aqueous soil environment.

The biotransformation is enhanced by stimulating indigenous naturally occurring anaerobic bacteria in the aqueous environment. By definition herein, stimulation of anaerobic bacteria means enhanced biotransformation of the halogenated organic compound by the bacteria. If indigenous naturally occurring anaerobic bacteria are not present or if the naturally occurring anaerobic bacteria are not sufficiently effective, then a desirable anaerobic bacteria can be provided as well as the agent of this invention.

More specifically, this invention, in one embodiment, is a method for enhancing the anaerobic biotransformation of at least one halogenated organic compound in an aqueous soil environment through stimulation of naturally occurring anaerobic bacteria in the aqueous soilenvironment by adding an agent selected from the group consisting of (a) propylene glycol, (b) glycerol, (c) glutamate, (d) a mixture of proteose peptone, beef extract, yeast extract, malt extract, dextrose and ascorbic acid and (e) mixtures of (a)–(d) in any combination thereof to at least a portion of the environment to produce an environment treated with the agent.

In another embodiment, this invention is a method for enhancing the anaerobic biotransformation of at least one halogenated organic compound in water from an aqueous soil environment through stimulation of bacteria which includes two steps. The first step is to add an agent selected from the group consisting of (i) propylene glycol, (ii) glycerol, (iii) glutamate, (iv) a mixture of proteose peptone, beef extract, yeast extract, malt extract, dextrose and ascorbic acid and (v) mixtures of (i)–(iv) in any combination thereof to the water to produce enriched water. The second step is to contact the enriched water with a bacteria capable of biotransforming the halogenated organic compound to produce a treated water.

Chemical structure is an important controlling factor in the biotransformation of chlorinated organic compounds. For chlorinated hydrocarbons, the ease of anaerobic biotransformation generally decreases as the number of chlorine atoms per molecule decreases. As a result, highly chlorinated organic compounds such as polychlorinated biphenyls, carbon tetrachloride, chloroform, tetrachloroethylene and trichloroethylene are readily biotransformable under anaerobic conditions, but not under aerobic conditions. On the other hand, lower chlorinated homologs such as dichloroethylene and vinyl chloride degrade slowly under anaerobic conditions and more rapidly under aerobic conditions. In contrast, relatively simple compounds, such as short chain hydrocarbons, alcohols, phenols and other small molecules, are relatively easy to degrade under both aerobic and anaerobic conditions.

The extent or degree of anaerobic biotransformation of highly chlorinated aliphatic hydrocarbons can be significantly enhanced by the addition of propylene glycol, glycerol, glutamate, a mixture of proteose peptone, beef extract, yeast extract, malt extract, dextrose and ascorbic acid, or mixtures thereof to the contaminated reaction environment which contains microorganisms capable of effecting biotransformation of chlorinated aliphatic hydrocarbons. Although not wishing to be bound to any particular theory, it is believed that the addition of the biotransformation enhancing agents of this invention noted above, support the growth of the bacteria or microorganisms, as well as assist in the reductive dehalogenation reactions. These biotransformation enhancing agents are believed to function as both growth substrates for the microorganisms and as particularly effective electron donors for the reducing reactions. In addition, the agents of this invention may also induce the synthesis of enzymes helpful in the reductive dehalogenation of chlorinated hydrocarbons.

In situ bioremediation of contaminated soil, sediments or water is generally performed by first identifying the contaminated region to be treated by sinking observation wells in a grid pattern covering the region and taking water samples from the wells or collecting soil samples in a grid pattern covering the region. Analysis is conducted on these samples to determine the concentration of halogenated or chlorinated compounds and type of compounds at the various locations in the contaminated region. Next, means are provided to transfer the biotransformation enhancing agents of this invention, and optionally conventional inorganic nutrients, to the contaminated region. This may be accomplished by sprinkling or spraying a liquid solution comprising the biotransformation enhancing agents on the surface of the contaminated region and allowing the liquid to permeate through the region. Alternatively, injection wells or other forms of conduits may be utilized.

It is preferred to dispense or distribute the agents uniformly throughout the contaminated region. A discussed above, microorganisms capable of biotransforming the halogenated or chlorinated contaminants may also be added if there are insufficient amounts or types of the microorganisms in the contaminated region. The amount of agent(s) of this invention to be added to the contaminated region should be an amount which when in the presence of the microorganisms, is effective to enhance biotransformation of the contaminants. For example, an effective amount may be a concentration of agent(s) as little as one tenth to equal the molar concentration of halogenated or chlorinated contaminant. However, the mole ratio of biotransformation enhancing agent to halogenated or chlorinated aliphatic contaminant can range from about 10:1 to as high as 100:1.

Referring now to FIG. 1, therein is shown a cross section of ground having a grade 90a, a water table 90b and a ground water flow direction 91. A source of perchloroethylene 92 has contaminated the soil 90c in the form of an aqueous subsurface plume 93 of perchloroethylene. The soil 90c is supported by a continuous layer of bedrock 90d. The plume 93 travels in the direction of the ground water flow 91 but at a lower velocity than the ground water flow because the perchloroethylene partitions between the soil and the ground water. An injection well 94 is used to add the agent of this invention to the plume 93. The agent enhances the anaerobic biotransformation of the perchloroethylene. Analysis of water from an observation well 95 confirms the enhanced anaerobic biotransformation of the perchloroethylene in the plume 93. Water can be withdrawn or pumped from a recovery well 96 to increase the ground water flow rate towards the recovery well 96. If the region around the injection well 94 tends to plug with bacterial growth upon the injection of the agent, then this problem can be solved, at least in part, by temporary addition of the agent followed by the addition of water to carry the agent away from the injection well 94, i.e., pulsed addition of the agent. Prior art nutrients, such as acetate, can be added to the environment either with the agents of this invention or at a different time than the agents of this invention.

Referring still to FIG. 1, if the aqueous subsurface environment shown lacks desirable indigenous naturally occurring anaerobic bacteria, then a desirable anaerobic bacteria can also be added such as via the injection well 94. It should be understood that the injection well 94 could have been positioned upstream of the plume 93 so that the added agent then flows into the plume 93. This approach is possible when the agents flow at about the same rate as the ground water and overtakes the plume 93. In some circumstances, it may also be desirable to add a source of oxygen, such as air, oxygen gas or hydrogen peroxide, to the plume 93, for example, at a point located near the observation vell 95. The amount of oxygen should be sufficient to produce an aerobic environment, which for the reasons discussed above, may be required in some circumstances to completely biodegrade a halogenated organic compound. Typically the environment is maintained at about 2–10 parts per million oxygen by weight.

Figure 2:
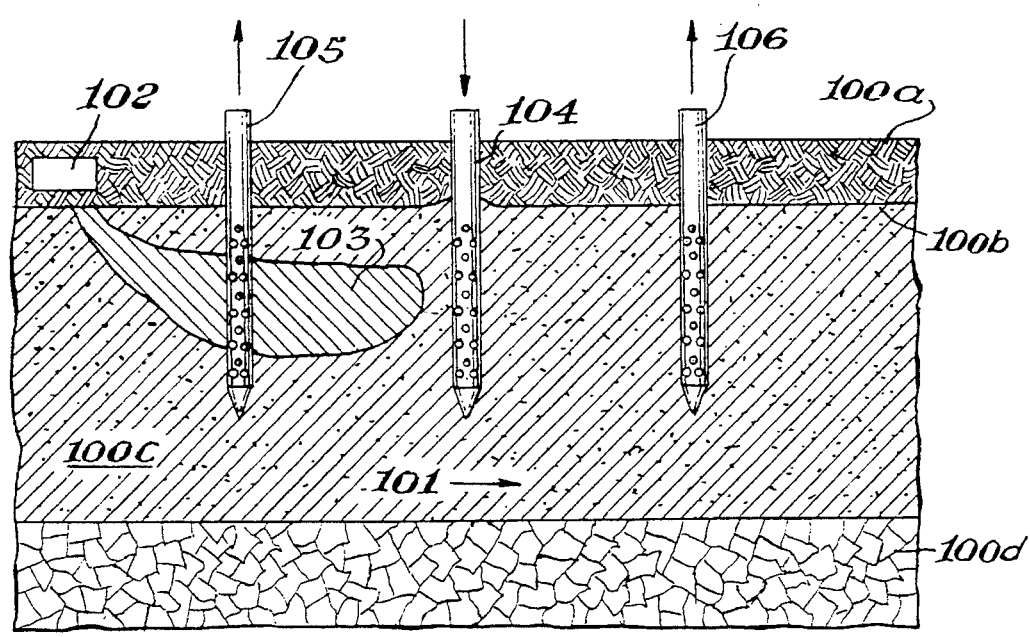
FIG. 2 shows a cross section of ground contaminated with a halogenated organic compound in the form of an aqueous subsurface plume which is being bioremediated by adding the agent to intercept the plume according to another application of this invention.

Referring now to FIG. 2, therein is shown a cross section of ground having a grade 100a, a water table 100b and a ground water flow direction 101. A source of trichloroethylene 102 has contaminated the soil 100c in the form of an aqueous subsurface plume 103 of trichloroethylene. The soil 100c is supported by bedrock 100d. The plume 103 travels in the direction of the ground water flow 101 but at a lower velocity than the ground water flow because the trichloroethylene partitions between the soil and the ground water. An observation well 105 has been used to characterize the plume 103. An injection well 104 is used to add the agent of this invention to the aqueous subsurface environment ahead of the plume 103. In this manner, when the plume 103 reaches the zone around the injection well 104, the environment will already contain the agent needed to enhance the anaerobic biotransformation of the trichloroethylene which can be confirmed by sampling at another observation well 106.

This invention is also suitable for anaerobic biotransformation of at least one halogenated organic compound in water from an aqueous soil environment through stimulation of anaerobic bacteria by adding the agent of this invention to the water and then contacting it with anaerobic bacteria for example in an above ground bioreactor. Contaminated soil can also be excavated and placed in a bioreactor. Above ground or ex situ bioremediation of aquifers frequently involves "pump and treat" operations which process and treat large volumes of contaminated ground water by use of one or more bioreactors. Generally, ex situ bioremediation of soil or water is performed by transferring the soil or water, or combinations thereof, to a bioreactor treatment process where a significant degree, if not all, of the biotransformation occurs. The agent is added to a bioreactor or upstream thereof. The amount of the biotransformation enhancing agent which is added is preferably an amount which when in conjunction with suitable microorganisms is effective to enhance biotransformation of the halogenated contaminant. As with in situ biotransformation, such an effective amount is a concentration of agent(s) as little as one tenth to equal the molar concentration of halogenated or chlorinated contaminant. However, the mole-ratio of biotransformation enhancing agent to halogenated or chlorinated aliphatic contaminant can range from about 10:1 to about 100:1.

Figure 3:
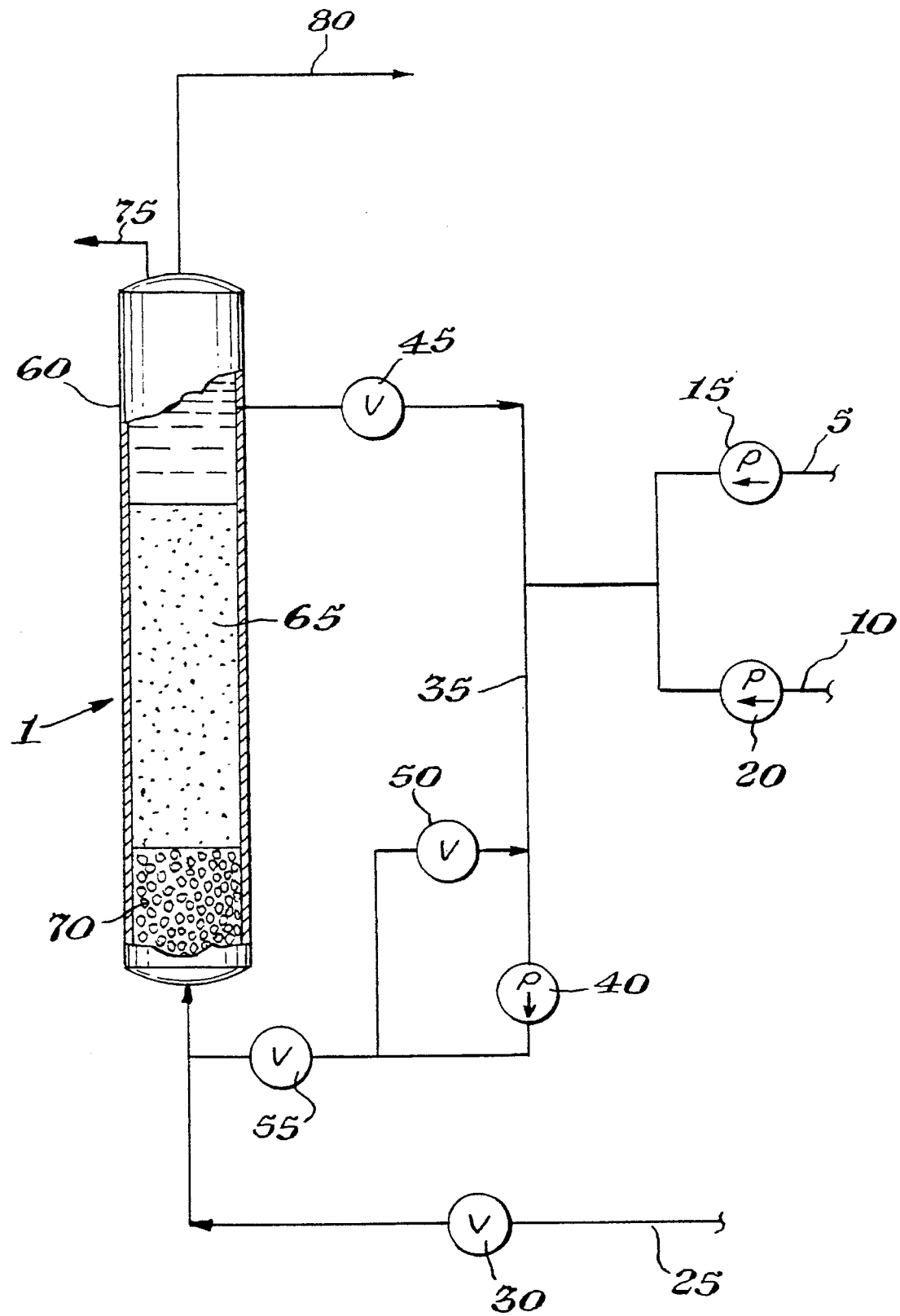
FIG. 3 shows an above ground bioreactor according to yet another application of this invention.

FIG. 3 illustrates an ex situ anaerobic bioremediation apparatus 1 featuring a bioreactor 60. Contaminated ground water feed 5 is pumped to apparatus 1 by feed pump 15. A second feed stream 10 containing one or more of the bioenhancing agents of this invention is pumped to apparatus 1 by feed pump 20. The two feed streams may be combined prior to or at the junction with recycle loop 35. Alternatively, one or both of feed 5 or 10 could be added directly to bioreactor 60. Recycle loop 35 may contain a recirculation pump 40, and one or more recirculation valves 45, 50, and 55. Prior to entering bioreactor 60, recycle loop 35 may be combined with one or more auxiliary feed streams 25, which in turn may be selected by auxiliary feed valve 30. Bioreactor 60 can comprise a first stage of gravel 70 and a secondary stage of granular activated carbon 65. Typically, feed and/or recycle streams are introduced at the bottom of a vertically oriented bioreactor and pumped upward through the reactor to a region where the liquid and gaseous phases of effluent may be separated or substantially separated. Exiting bioreactor 60 are liquid effluent 75 and gaseous effluent 80, both streams having significantly lower concentrations of halogenated hydrocarbon contaminants than contaminated feed 5.

Although this invention has been described primarily in terms of the biotransformation of chlorinated aliphatic hydrocarbons, it is clearly envisaged that the biotransformation enhancing agents of this invention would also be useful for biotransforming other halogenated compounds such as brominated, fluorinated, and iodinated hydrocarbons to their respective lower homologs. Moreover, this invention is suited for the biotransformation of halogenated aromatic hydrocarbons.

A series of experiments are conducted to demonstrate the superiority of the agents of this invention over several conventional organic nutrients: acetate, butyrate, laurate, methanol, ethanol, butanol, polyethylene glycol, glucose and sucrose. In the experiments described below, the extent and rate of biotransformation of perchloroethylene, trichloroethylene, dichloroethylene and vinyl chloride are demonstrated.

Soil and ground water samples are obtained from a water table aquifer located along the South Canadian River in Norman, Okla. Ground water samples are analyzed for conventional parameters, including alkalinity, total organic carbon, and the biochemical oxygen demand. Aquifer samples are also submitted for analysis of soil texture as well as the organic and inorganic content of both the soil and ground water. Physicochemical characteristics of the soil and ground water are summarized in Table 1.

TABLE 1

Physiochemical characteristics of ground water and aquifer sediment.

| Ground Water | |
| --- | --- |
| Depth to water table (m) | 2.1 |
| Temperature (C. | 22.2 |
| pH | 7.6 |
| Total organic carbon (mg/L) | 194 |
| Chemical oxygen demand (mg/L) | 565 |
| Biological oxygen demand (5-day; mg/L) | 9.5 |
| Alkalinity (mg/L) | 1950 |
| Conductivity (mmhos/cm) | 6.4 |
| Sodium (mg/L) | 691 |
| Potassium (mg/L) | 327 |
| Magnesium (mg/L) | 157 |
| Calcium (mg/L) | 193 |
| Bicarbonate (mg/L) | 2590 |
| Ortho-phosphate (mg/L) | 0.9 |
| Nitrate (mg/L) | 1.6 |
| Sulfate (mg/L) | 33 |
| Chloride (mg/L) | 890 |
| Subsurface soil | |
| Texture | |
| Sand (%) | 95 |
| Silt (%) | 2 |
| Clay (%) | 3 |
| pH | 9.0 |
| Organic carbon (%) | 0.3 |
| Cation exchange capacity (meq/100 g) | 5.7 |
| Base saturation (%) | |
| Na | 18.3 |
| K | 8.9 |
| Mg | 9.4 |
| Ca | 63.5 |

The water table at the sampling site is relatively shallow, and is located at 2.1 m below grade. The in situ temperature of the aquifer is approximately 22.2° C. The ground water exhibits relatively neutral pH (7.6), with moderately high alkalinity and conductivity. Predominant cations in the water are sodium and potassium, while bicarbonate and chloride are the dominant anions. The sampling site appears to be contaminated by landfill leachate, as indicated by the high levels of dissolved organic carbon (194 mg/L) and chemical oxygen demand (565 mg/L). Further analysis suggested that the majority of the organic constituents were relatively non-biodegradable. The 5-day biochemical oxygen demand of the ground water is approximately 9.5 mg/L, which is equivalent to about 2% of the chemical oxygen demand. Inorganic nutrients, including nitrate, orthophosphate and sulfate, are present at low levels in the water. The aquifer soil is characterized as a sand based on the low silt and clay content. The low percentage of clay is consistent with the low cation exchange capacity. The organic carbon content of the soil is low (0.3%).

Soil samples are obtained by digging into the top of the water table. Soil samples are transferred into sterile glass jars. To minimize exposure of the anaerobic samples to oxygen, the jars are filled completely with soil and ground water, and subsequently sealed. Soil samples are chilled on ice during transport to the laboratory. Ground water is obtained from the sampling site by allowing the hole formed by the excavation of the soil samples to fill with ground water, and bailing the water into a large glass container. The solids are allowed to settle, and the water is transferred into plastic coated glass bottles. The filled containers are chilled on ice during shipment to the laboratory. Ground water samples are filtered (0.45 micrometer pore size) and stored at 4° C.

Studies are initially conducted to examine the biotransformation of 1.0 ppm of perchloroethylene which is added to microcosm samples prepared using soil and ground water from the contaminated site. In those initial studies, no additional treatments or supplements of conventional nutrients or agents of this invention are added to the sample microcosms. The anaerobic sample microcosms are prepared by transferring 10 grams of soil (wet weight) and 6 mL of ground water into sterile 20 mL vials. The vials utilized in the experiments described herein provide approximately 10 ml of head space above the surface of the soil or water for the collection of gases. The production of and collection of gas in the vial head space provides an indication of the extent of biological activity occurring in the sample. The ground water is purged with nitrogen gas prior to use, and the sample microcosms are prepared in an anaerobic glove box containing an atmosphere of 70% $N_2$, 28% $CO_2$, 2% $H_2$. The sample microcosms are supplemented with 1 mM of sodium sulfide and 0.0002% resazurin as the redox indicator. Resazurin (technical grade) is obtained from Sigma Chemical Company of St. Louis, Mo.

Figure 4:
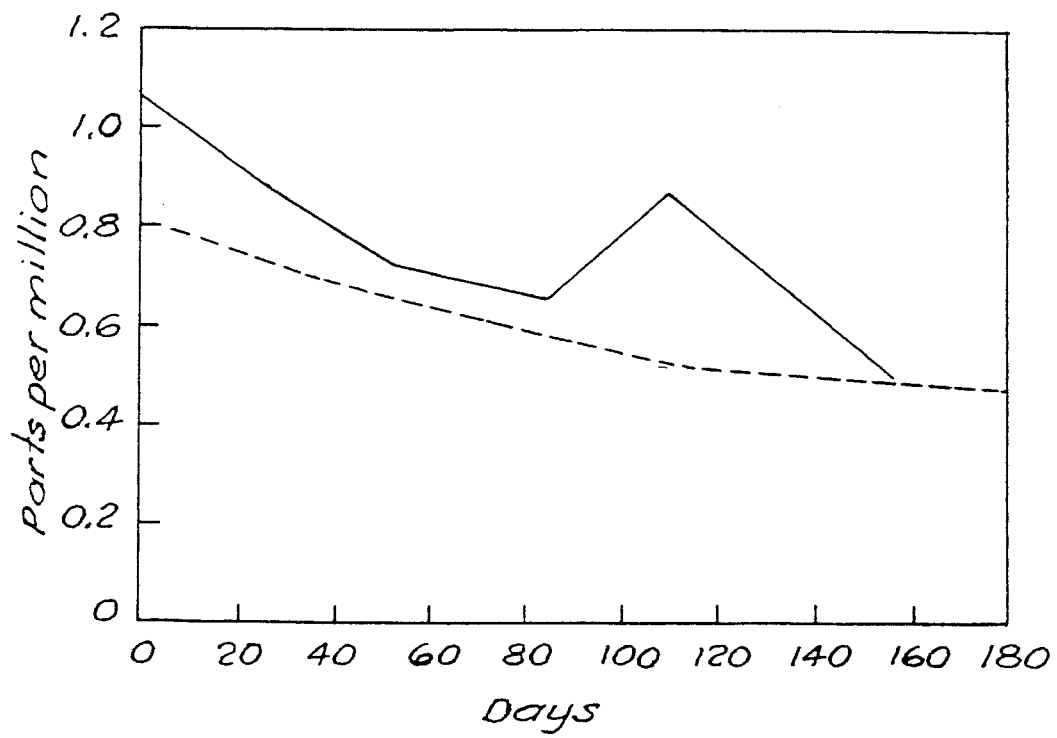
FIG. 4 is a graph comparing the rate of biotransformation of perchloroethylene to trichloroethylene in an untreated soil and ground water sample to that in a killed control sampler.

As shown in FIG. 4, biotransformation rates of perchloroethylene are very slow, since changes in the concentration of perchloroethylene in biologically active microcosms (solid lines) are comparable to killed controls (dashed lines). Killed controls are included in the study to monitor for non-biological losses of perchloroethylene. The killed controls are prepared as described above using autoclaved soil (3×1 hr treatments) and are adjusted to contain 500 ppm (w/w) of $HgCl_2$. After 160 days, the levels of perchloroethylene are reduced by 56% in the active samples as compared with a 41% reduction in the killed controls at day 173. A trace of trichloroethylene is the only transformation product detected in the sample microcosms (dotted line) and is attributed to biological activity, because trichloroethylene is not detected in the killed controls.

Decreases in the perchloroethylene concentration in the killed control samples are attributed to physical losses. Subsequent analysis of selected septa that are used to seal microcosms in which perchloroethylene has been added indicate that substantial adsorption of perchloroethylene into the septum has occurred during incubation.

The slow biotransformation of perchloroethylene in the sample microcosms is consistent with lack of evidence for active methanogenesis in the samples. Although the formation of trace amounts of methane is detected in the active microcosms by gas chromatography, no increase in gas volume is observed during the six month incubation period. The minimal biological activity in the samples is consistent with the fact that the organic constituents present in the ground water are relatively non-biodegradable, as indicated by the low 5-day biochemical oxygen demand.

The potential for biotransformation of several additional chlorinated compounds, including perchloroethylene, trichloroethylene, cis-1,2-dichloroethylene, and trans-1,2-dichloroethylene is also examined in microcosms prepared using soil and ground water from the contaminated site. Those microcosms are prepared as described above, with 1.0 ppm of the chlorinated compounds added. These sample microcosms are not supplemented with a conventional nutrient or a biotransformation enhancing agent of this invention. No degradation is noted during six months of incubation, presumably due to the low biological activity in the samples (data not included herein).

Since the methanogenic activity is marginal in sample microcosms prepared with ground water from the contaminated site, an attempt is made to stimulate biological activity by addition of organic compounds. In order to compare the agents of this invention to conventional organic nutrients, soil-water microcosms are prepared using synthetic ground water containing a variety of inorganic constituents, and supplemented with 100 ppm of either one of the agents of this invention or a conventional organic nutrient, and 1.0 ppm of either perchloroethylene or trichloroethylene. The synthetic ground water is composed of, per liter: $NaHCO_3$, 3.57 g; KCl, 0.6 g; $CaCl_2:2H_2O$, 0.7 g; and $MgCl_2:6H_2O$, 1.32 g. Additional microcosms, designated as blank controls, are prepared to examine the stimulation of methanogenic activity by the organic nutrients in the absence of perchloroethylene and trichloroethylene.

The addition of 100 ppm of either a conventional organic nutrient or one of the biotransformation enhancing agents of this invention stimulates methanogenic activity in the microcosms however, to varying degrees. As summarized in Table 2 below, increases in gas volume over a period of several months is detected in both the blank controls and sample microcosms containing 1.0 ppm of either perchloroethylene or trichloroethylene. Gas volume measurements are performed with 20 mL glass syringes equipped with 26 gauge needles as follows. The soil-water microcosms are removed from the incubator and allowed to equilibrate to ambient conditions (22° C.) prior to measurement. The syringe is lubricated with deionized water, inserted into the head space volume of the samples and held in a horizontal position during measurement. Readings are verified by drawing the plunger past the equilibrium point and releasing. The gas is reinjected into the sample microcosm head space following volume determination.

The generation of methane and the determination of changes in the concentration of chlorinated hydrocarbon in the sample microcosms are confirmed by gas chromatographic analysis of the head space gas. Head space gases are analyzed using a Hewlett-Packard model 19395A automated head space sampler coupled to a model 5890A gas chromatograph equipped with a flame ionization detector. The head space sampler is operated with the following conditions: sample temperature, 70° C.; equilibration time, 2.5 hour; valve/loop temperature, 80° C.; pressurization time, 5 sec; injection loop fill time, 8 sec; injection time, 42 sec; and nitrogen carrier gas at 0.4 bar. Head space samples are injected using a split ratio of 2:1 at an injector temperature of 200° C. with a continuous septum purge of 5 mL/min. Chromatography is performed using a GSQ megabore capillary column (30 meter×0.53 mm i.d.; J&W Scientific, Folsom, Calif.). Compounds are eluted using nitrogen as the carrier gas at a flow rate of 15 ml/min at a head pressure of 5 psi. The column temperature is initially held at 30° C. for 3 minutes, increased at a rate of 5° C./min to 65° C. and held for 10 minutes, then increased at 20° C./min to 165° C. and held for 5 minutes, and finally increased at a rate of 5° C./min to 200° C. and held for 3 minutes. Output of the flame ionization detector is connected to a PE Nelson Access Chrom GC/LC computer data system. Concentrations are calculated from peak area measurements by comparison with an external standard mixture prepared in water. Since a flame ionization detector is used, the sensitivity of the analysis varies among the different compounds. Quantitation limits for the chlorinated hydrocarbons ranges from 5 to 25 ppb.

Methane production is measured as early as one month in the blank controls, suggesting a fairly rapid response of the methanogenic community to addition of either a conventional organic nutrient or one of the agents of this invention (see Table 2). The gas volume of the blank controls continues to increase and appears to reach a maximum after about two months of incubation. Slight decreases in gas volume are observed in some of the blank controls after four months. The maximum quantities of gas produced varies among sample microcosms utilizing the various conventional organic nutrients and biotransformation enhancing agents of this invention, and are consistent with gas volumes calculated on the basis of theoretical considerations as discussed below.

Gas production from the methanogenic biodegradation of either the conventional nutrients or the biotransformation enhancing agents of this invention are calculated based on the stoichiometry of the reaction given by the Buswell equation:

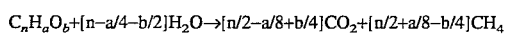

$$C_nH_aO_b + [n-a/4-b/2]H_2O \rightarrow [n/2-a/8+b/4]CO_2 + [n/2+a/8-b/4]CH_4$$

When the conventional organic nutrient or the agent of this invention contain carboxyl groups that are neutralized before addition to the test bottles, one $CO_2$ group per neutralized carboxyl group is subtracted from the stoichiometry given by the Buswell equation since this group does not contribute to the gas phase. Gas volume is calculated based on the stoichiometry and quantity of the conventional organic nutrient or agent of this invention added to the soil water microcosms. Because of the solubilities of methane and carbon dioxide in the sample microcosms, gas volumes are corrected using the empirical relationships described by Sheldon and Tiedje. Methane and carbon dioxide volumes are multiplied by 0.95 and 0.35, respectively, to obtain the approximate volumes expected in the head space.

Gas production in samples having 1.0 ppm of either perchloroethylene or trichloroethylene added appears to proceed at a slower rate as compared to gas production in blank controls (see Table 2). While maximum gas production is achieved after two months in the blank controls, about four months are required to attain maximum gas volumes in most of the sample microcosms containing perchloroethylene or trichloroethylene. Although the presence of perchloroethylene decreases the rate of gas production, the maximum volumes of gas produced are generally comparable in the sample microcosms having perchloroethylene and in the blank controls. In contrast, maximum gas volumes are often greater in microcosms having trichloroethylene added as compared to the blank controls. The reason for this is unclear.

TABLE 2

Gas production in microcosms supplemented with 100 ppm of various conventional organic nutrients or the agents of this invention

| | Theoretical Gas Volume (mLs) | Blank control (1) | Blank control (2) | Blank control (4) | Perchloroethylene (2) | Perchloroethylene (4) | Trichloroethylene (2) | Trichloroethylene (4) |
|---|---|---|---|---|---|---|---|---|
| Native ground water | — | 0.0 | 0.0 | 0.0 | 0.0 | 0.0 | 0.0 | 0.0 |
| Na Acetate | 0.4 | 0.1 | 0.5 | 0.2 | 0.5 | 0.7 | 0.0 | 1.1 |
| Na Butyrate | 0.9 | 0.3 | 1.1 | 1.0 | 0.7 | 1.4 | 1.2 | 2.2 |
| Na Laurate | 1.6 | 0.7 | 1.9 | 1.7 | 0.6 | 1.9 | 1.0 | 2.0 |
| Methanol | 1.0 | 0.3 | 1.0 | 0.7 | 0.7 | 0.8 | 0.8 | 0.9 |
| Ethanol | 1.3 | 0.3 | 1.4 | 1.0 | 0.9 | 1.2 | 1.3 | 1.3 |
| Butanol | 1.7 | 0.7 | 1.5 | 1.7 | 0.6 | 1.6 | 1.5 | 1.8 |
| Propylene glycol[1] | 1.1 | 0.3 | 0.8 | 1.0 | 0.7 | 1.7 | 0.3 | 2.0 |
| Glycerol[1] | 0.9 | 0.9 | 1.2 | 1.0 | 1.0 | 1.4 | 0.7 | 2.0 |
| Polyethylene glycol | — | 0.3 | 1.0 | 1.0 | 0.5 | 1.1 | 1.1 | 1.3 |
| Glucose | 0.8 | 0.5 | 1.0 | 0.8 | 1.0 | 1.1 | 0.3 | 1.8 |
| Sucrose | 0.9 | 0.5 | 1.0 | 0.9 | 1.0 | 1.2 | 1.0 | 1.9 |
| Glutamate[1] | — | 0.1 | 0.8 | 0.5 | 1.0 | 1.1 | 0.2 | 1.4 |
| AC Broth[1] | — | 0.1 | 0.5 | 0.5 | 1.0 | 1.1 | 0.6 | 1.5 |

[1] Biotransformation enhancing agents of this invention.

Figure 5:
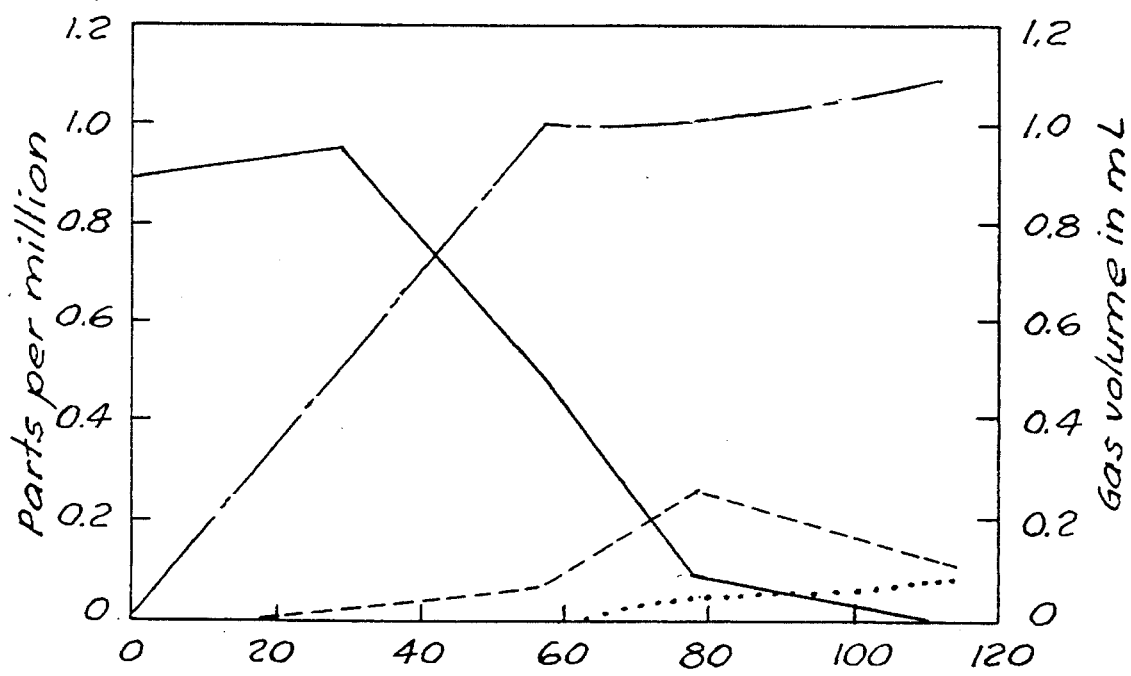
FIG. 5 is a graph illustrating the rate of enhanced biotransformation of perchloroethylene utilizing an agent composed of proteose peptone, beef extract, yeast extract, malt extract, dextrose and ascorbic acid.

The addition of 100 ppm of the conventional organic nutrients or biotransformation enhancing agents of this invention to the sample microcosms stimulates the reductive dehalogenation of perchloroethylene and trichloroethylene. For example, the effects of AC Broth on the biotransformation of 1.0 ppm of perchloroethylene are shown in FIG. 5. Degradation of perchloroethylene (solid line) appears to be preceded by an initial lag phase, which may represent the time required for development of an active microbial community. Note that gas production is measured beginning at two months. Following the lag period, perchloroethylene is rapidly degraded with greater than 99% disappearance after 113 days of incubation. Perchloroethylene is initially converted to trichloroethylene (dashed line) by reductive dehalogenation. Stimulation of methanogenic activity by the addition of AC Broth resulted in the enhancement of dehalogenation activity since traces of trichloroethylene are detected in the microcosms after one month. After 77 days, the formation of cis-1,2-dichloroethylene (dotted line), a lower chlorinated homolog of trichloroethylene, is also detected in the microcosms. Gas generation during this experiment is shown in FIG. 5 by the dashed and dotted line.

The effects of the agents of this invention and conventional organic nutrients on the biotransformation of perchloroethylene and trichloroethylene in the sample microcosms are summarized in Tables 3 and 4 below. The reductive dehalogenation of perchloroethylene is stimulated to the greatest extent by AC Broth, propylene glycol and glycerol, as indicated by the extent of conversion of perchloroethylene to lower chlorinated homologs. Addition of propylene glycol and glycerol to the microcosms results in the dehalogenation of perchloroethylene (PCE) to trichloroethylene (TCE) and cis-1,2-dichloroethylene (cis-DCE), while AC Broth also promotes further transformation to trans-1,2-dichloroethylene (trans-DCE) and vinyl chloride (VC). Methanol, butanol, glutamate and sucrose, are also effective in stimulating the conversion of perchloroethylene to dechlorinated homologs. Although cis-1,2-dichloroethylene is detected in the sample microcosms, substantial quantities of trans-1,2-dichloroethylene are also detected after 4 months in microcosms in which methanol or butanol have been added. The high levels of trans-1,2-dichloroethylene are unusual, since the cis-isomer appears to be the predominant product in the majority of the samples. The remaining conventional organic nutrients are less effective in stimulating reductive dehalogenation, and generally results in a one-step transformation of perchloroethylene to trichloroethylene.

Of the nutrients and agents tested, propylene glycol, glycerol, glutamate and AC Broth are the most effective in stimulating the biotransformation of trichloroethylene as illustrated in Table 4 and thus their superiority over conventional nutrients is demonstrated. Although cis-1,2-dichloroethylene and vinyl chloride are the predominant products, propylene glycol and glutamate promote the complete dehalogenation of trichloroethylene to ethylene. The production of traces of vinyl chloride is also detected in sample microcosms having laurate and sucrose added. The remaining conventional nutrients are less effective in stimulating reductive dehalogenation, and generally results in a single-step transformation of trichloroethylene to dechlorinated homologs.

TABLE 3

Effects of addition of conventional organic nutrients and agents of this invention on the biotransformation of 1 ppm perchloroethylene (6.0 umol/kg) in methanogenic microcosms.

| | Concentration in sample microcosms after 4 months (umol/kg) | | | | |
|---|---|---|---|---|---|
| | PCE | TCE | cis-DCE | trans-DCE | VC |
| Acetate | 1.70 | trace[1] | nd | nd | nd |
| Butyrate | 1.65 | 0.27[2] | nd | nd | nd |
| Laurate | 2.69 | trace | nd | trace | nd |
| Methanol | 1.33 | 1.10 | trace | 0.43 | nd |
| Ethanol | 2.68 | trace | nd | trace | nd |
| Butanol | 1.31 | 0.85 | 0.22 | 0.50 | nd |
| Propylene glycol[3] | 0.52 | 1.03 | 0.49 | trace | nd |
| Glycerol[3] | 0.58 | 1.18 | 0.21 | trace | nd |

TABLE 3-continued

Effects of addition of conventional organic nutrients and agents of this invention on the biotransformation of 1 ppm perchloroethylene (6.0 umol/kg) in methanogenic microcosms.

| | Concentration in sample microcosms after 4 months (umol/kg) | | | | |
|---|---|---|---|---|---|
| | PCE | TCE | cis-DCE | trans-DCE | VC |
| Polyethylene glycol | 2.35 | trace | nd | trace | nd |
| Glucose | 1.35 | 0.57 | nd | nd | nd |
| Sucrose | 1.07 | 0.89 | trace | trace | nd |
| Glutamate[3] | 1.14 | 0.63 | trace | trace | nd |
| AC Broth[3] | trace | 1.11 | 1.02 | trace | trace |
| Killed control | 3.00 | nd | nd | nd | nd |

[1]Quantitation limits as follows (umol/kg): PCE, 0.15; TCE, 0.19; cis-DCE, 0.10; trans-DCE, 0.10; and VC, 0.16. Trace concentrations were measurable, but below the quantitation limit.
[2]Concentration measured after 3 months of incubation.
[3]Biotransformation enhancing agent of this invention.

TABLE 4

Effects of addition of conventional organic nutrients and agents of this invention on the biotransformation of 1 ppm trichloroethylene (7.6 umol/kg) in methanogenic microcosms.

| | Concentration in sample microcosms after 4 months (umol/kg) | | | | |
|---|---|---|---|---|---|
| | TCE | cis-DCE | trans-DCE | VC | Ethylene |
| Acetate | 3.99 | nd | nd | nd | nd |
| Butyrate | 3.85 | trace[1] | trace | nd | nd |
| Laurate | 3.67 | nd | nd | trace | nd |
| Methanol | 4.01 | trace | nd | nd | nd |
| Ethanol | 4.06 | nd | nd | nd | nd |
| Butanol | 3.88 | trace | nd | nd | nd |
| Propylene glycol[4] | 2.05 | 2.53 | trace | 4.20[2] | trace[2] |
| Glycerol4 | 1.91 | 2.57 | trace | nd | nd |
| Polyethylene glycol | 3.65 | nd | trace | nd | nd |
| Glucose | 4.00 | trace | nd | nd | nd |
| Sucrose | 3.57 | 0.17 | nd | trace | nd |
| Glutamate[4] | 2.10 | trace | trace | 3.37 | 0.18 |
| AC Broth[4] | 2.03 | 2.49 | trace | trace[3] | nd |
| Killed control | 4.52 | nd | nd | nd | nd |

[1]Quantitation limits as follows (umol/kg): TCE, 0.19; cis-DCE, 0.10; trans-DCE, 0.10; VC, 0.16; and Ethylene, 0.18. Trace concentrations were measurable, but below the quantitation limit.
[2]Concentration measured after 3 months of incubation.
[3]Concentration measured after 2 months of incubation.
[4]Biotransformation enhancing agent of this invention.

To further compare the effect upon biotransformation of perchloroethylene and trichloroethylene by the biotransformation enhancing agents of this invention to conventional organic nutrients, the experimental data are analyzed using a first-order kinetic equation. Pseudo-first-order rate constants for the disappearance of perchloroethylene and trichloroethylene in both active and killed control microcosms are obtained by log-linear regression of the concentration versus time plots. Rate constants for abiotic losses ($k_a$) of perchloroethylene and trichloroethylene are obtained from analysis of the control data. Kinetic constants for biological transformation ($k_b$) are calculated from the difference of the rate constants estimated for the overall losses in active microcosms ($k_t$), and the rate observed in the killed controls ($k_a$). A summary of the rate constants is given in Tables 5 and 6 below.

The term $t_{1/2}$ in Tables 5 and 6 refers to the half life in the given system, i.e., the time needed to reduce the concentration of the perchloroethylene, trichloroethylene or other halogenated organic compound to one-half of its original concentration. Preferably in this invention the amount of agent used is sufficient to decrease the half-life of the halogenated organic compound in the environment treated with the agent by a factor of at least two in at least a portion of the treated environment, relative to the half-life of the halogenated organic compound without the addition of the agent. More preferably the half-life is so reduced by a factor of at least 4. Most preferably the half-life is so reduced by a factor of at least 10. The data in Table 5 for the more highly chlorinated perchloroethylene show a reduction by a factor of from 14 to 60. The data in Table 6 for the less highly chlorinated trichloroethylene show a reduction by a factor of from 6.7 to 11.7.

TABLE 5

Summary of kinetic parameters for the abiotic and biological transformation of perchloroethylene in methanogenic microcosms.

| | Pseudo-first-order rate constant (day$^{-1}$) | | | |
|---|---|---|---|---|
| | $k_t$ | $k_a$ | $k_b$ | t½ (days) |
| Native Ground Water | 0.00176 | 0.00141 | 0.00035 | 1980 |
| Acetate | 0.00484 | 0.00141 | 0.00343 | 202 |
| Butyrate | 0.00493 | 0.00141 | 0.00352 | 197 |
| Laurate | 0.00248 | 0.00141 | 0.00107 | 645 |
| Methanol | 0.00254 | 0.00141 | 0.00113 | 613 |
| Ethanol | 0.00260 | 0.00141 | 0.00119 | 581 |
| Butanol | 0.00266 | 0.00141 | 0.00125 | 553 |
| Propylene glycol[1] | 0.01245 | 0.00141 | 0.01104 | 63 |
| Glycerol[1] | 0.01245 | 0.00141 | 0.01104 | 63 |
| Polyethylene glycol | 0.00290 | 0.00141 | 0.00149 | 465 |
| Glucose | 0.00595 | 0.00141 | 0.00454 | 153 |
| Sucrose | 0.00683 | 0.00141 | 0.00542 | 128 |
| Glutamate[1] | 0.00642 | 0.00141 | 0.00501 | 138 |
| AC Broth[1] | 0.2234 | 0.00141 | 0.02093 | 33 |

[1]Biotransformation enhancing agent of this invention.

TABLE 6

Summary of kinetic parameters for the abiotic and biological transformation of trichloroethylene in methanogenic microcosms.

| | Pseudo-first-order rate constant (day$^{-1}$) | | | |
|---|---|---|---|---|
| | $k_t$ | $k_a$ | $k_b$ | t½ (days) |
| Native Ground Water | 0.00191 | 0.00112 | 0.00079 | 877 |
| Acetate | 0.00202 | 0.00112 | 0.00089 | 771 |
| Butyrate | 0.00229 | 0.00112 | 0.00117 | 590 |
| Laurate | 0.00231 | 0.00112 | 0.00118 | 582 |
| Methanol | 0.00214 | 0.00112 | 0.00102 | 679 |
| Ethanol | 0.00201 | 0.00112 | 0.00088 | 780 |
| Butanol | 0.00222 | 0.00112 | 0.00109 | 633 |
| Propylene glycol[1] | 0.00802 | 0.00112 | 0.00689 | 101 |
| Glycerol[1] | 0.00641 | 0.00112 | 0.00529 | 131 |
| Polyethylene glycol | 0.00235 | 0.00112 | 0.00123 | 562 |
| Glucose | 0.00224 | 0.00112 | 0.00111 | 621 |
| Sucrose | 0.00251 | 0.00112 | 0.00139 | 498 |
| Glutamate[1] | 0.01034 | 0.00112 | 0.00921 | 75 |
| AC Broth[1] | 0.00493 | 0.00112 | 0.00381 | 182 |

[1]Biotransformation enhancing agent of this invention.

The degradation of perchloroethylene is stimulated to a greater extent than trichloroethylene by addition of either a conventional organic nutrient or one of the agents of this invention. Half-lives for perchloroethylene biotransformation are decreased by 67% to 98% as compared to a half-life of approximately 1980 days in microcosms prepared with the native ground water (Table 5). Although the addition of all conventional organic nutrients and agents of this invention appears to stimulate the degradation rate, not all are equally effective. AC Broth, propylene glycol and glycerol are the most effective in enhancing the rate of biological activity, and decreases the half-life for perchloroethylene in the samples to a range between 33 and 63 days. Sucrose and glutamate are also effective, and decreases the half-life by about 93%. These results are consistent with previous observations based on the extent of conversion of perchloroethylene to lower chlorinated homologs. Perchloroethylene biotransformation rates also appears to be stimulated by acetate, butyrate or glucose addition (t ½=153 to 202 days), although significant accumulation of intermediate homologs in these reactions is not observed (Table 3). Since the septa used to seal the microcosms are shown to adsorb halogenated compounds from the system, some of the lack of correlation between reaction rates and product accumulation may be due to physical losses. As previously noted, the biotransformation of perchloroethylene in samples containing methanol and butanol results in the accumulation of high levels of trichloroethylene and trans-1,2-dichloroethylene, however, the reaction rates are only enhanced by 69% to 72% (Table 5). The remaining conventional organic nutrients, including ethanol, laurate and polyethylene glycol, are less effective in stimulating the biotransformation rates.

The addition of either conventional organic nutrients or one of the agents of this invention also stimulates the biotransformation of trichloroethylene, and half-lives are decreased by 11% to 91% as compared to samples prepared with the native ground water (Table 6). Of the nutrients and agents tested, propylene glycol, glycerol, glutamate and AC Broth are the most effective in enhancing the biotransformation rate, and decreases the trichloroethylene biotransformation half-life to a range between 75 and 182 days. These results are consistent with previous observations based on the extent of conversion of trichloroethylene to dehalogenated products. In contrast, the conventional organic nutrients are less effective in stimulating biotransformation rates, since the half-life for trichloroethylene is decreased by an average of 28% as compared to samples in which no nutrient or agent had been added.

Figure 6:
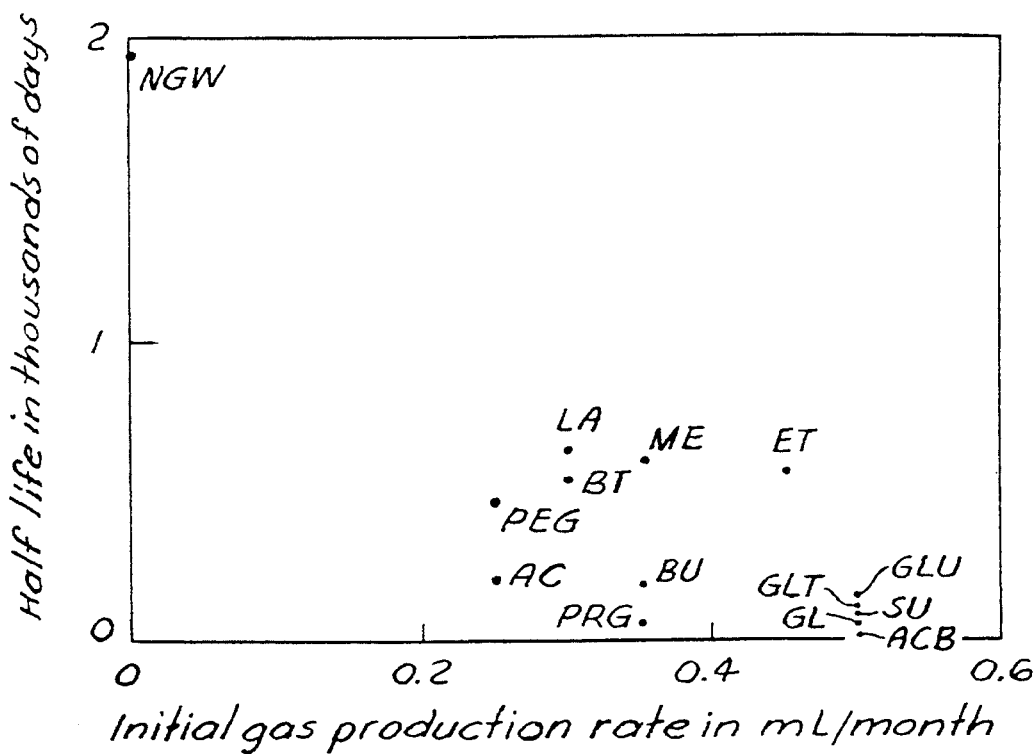
FIG. 6 is a graph illustrating the biotransformation half life of perchloroethylene and corresponding initial gas production rates utilizing the biotransformation enhancing agents of this invention as compared to prior art agents.

While the addition of either a conventional organic nutrient or one of the biotransformation enhancing agents of this invention to the aquifer soil in the sample microcosms stimulates gas production as well as reductive dehalogenation of chlorinated hydrocarbons, the relationship between methanogenesis and the biotransformation rate is unclear. Initial attempts to correlate degradation half-lives with the total gas volume are unsuccessful. In addition, since an excess of each conventional nutrient or agent of this invention (100 ppm) are added to the microcosms as compared to the concentration of the chlorinated hydrocarbon (1 ppm), it is not possible to quantitate the effects of reductive dehalogenation on the overall electron balance. FIG. 6 shows the relationship between half-lives for perchloroethylene biotransformation and the initial gas production rate, which is calculated from the increase in gas volume observed following two months of incubation, wherein the following abbreviations are used: native ground water (NGW); acetate (AC); butyrate (BU); laurate (LA); methanol (ME); ethanol (ET); butanol (BT); propylene glycol (PRG); glycerol (GL); polyethylene glycol (PEG); glucose (GLU); sucrose (SU); glutamate (GLT); and AC Broth (ACB). With perchloroethylene, the dehalogenation rate appears to correlate to some extent with the initial gas production rate. For example, AC Broth, glycerol, sucrose and glutamate are rapidly converted to methane in the samples, and significantly enhances the dehalogenation of perchloroethylene to lower chlorinated homologs. Biotransformation rates are generally slower in samples exhibiting lower gas production rates. However, propylene glycol is highly effective in stimulating the biotransformation of perchloroethylene, and yet appears to be more slowly degraded under methanogenic conditions. In contrast, conventional nutrients, such as methanol and ethanol, are converted to methane at rates equal to or greater than propylene glycol, and yet are less effective in stimulating perchloroethylene biotransformation.

Figure 7:
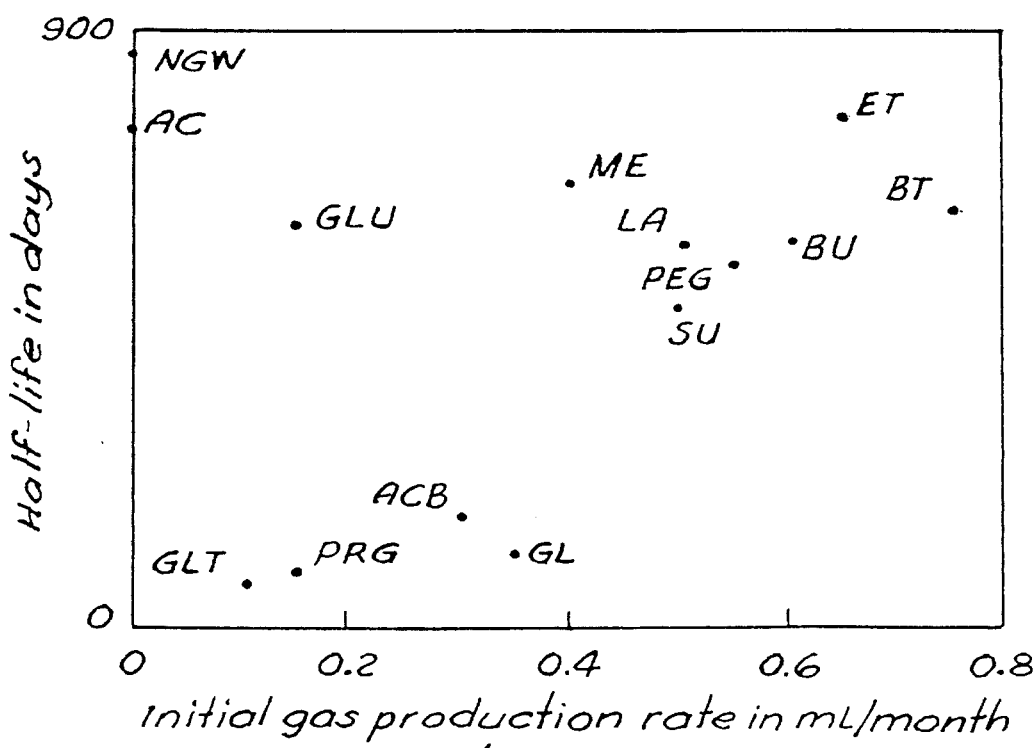
FIG. 7 is a graph illustrating the biotransformation half life of trichloroethylene and corresponding initial gas production rates utilizing the biotransformation enhancing agents of this invention as compared to prior art agents.

No correlation is evident between the initial gas production rate and the decreased half-life for trichloroethylene biotransformation as illustrated in FIG. 7, wherein the following abbreviations are used: native ground water (NGW); acetate (AC); butyrate (BU); laurate (LA); methanol (ME); ethanol (ET); butanol (BT); propylene glycol (PRG); glycerol (GL); polyethylene glycol (PEG); glucose (GLU); sucrose (SU); glutamate (GLT); and AC Broth (ACB). Glutamate, propylene glycol, glycerol and AC Broth are shown to significantly enhance both the rate and extent of trichloroethylene dehalogenation, although these agents appear to be slowly converted to methane as indicated by lower gas production rates. In contrast, trichloroethylene biotransformation is slower in samples which exhibit the highest gas production rates. These results suggest that the reductive dehalogenation of trichloroethylene may not be directly associated with methanogenesis.

Additional studies are conducted to examine the effects of addition of either conventional organic nutrients or one of the biotransformation enhancing agents of this invention (100 ppm) on the biotransformation of cis-1,2-dichloroethylene (1.0 ppm) in aquifer microcosms. As shown in Table 7, of the organic nutrients and agents tested, the majority are only slightly effective in promoting the reductive dehalogenation of cis-1,2-dichloroethylene. For example, traces of vinyl chloride and ethylene are occasionally detected in sample microcosms amended with butyrate, laurate, propylene glycol, and glucose, although changes in concentration of cis-1,2-dichloroethylene after 4 months are comparable to the killed controls. Acetate, ethanol, butanol, glycerol, polyethylene glycol (mw 600) and sucrose have no effect on stimulating biotransformation rates or product formation. In contrast, AC Broth, glutamate, and methanol are shown to be effective in stimulating the reductive dehalogenation of cis-1,2-dichloroethylene. After 4 months, more than 60% of the initial amount of cis-1,2-dichloroethylene is degraded in the samples. While methanol promotes the conversion of cis-1,2-dichloroethylene to vinyl chloride, significant conversion to ethylene is observed in samples in which AC Broth and glutamate have been added.

TABLE 7

Effects of addition of conventional organic nutrients and agents of this invention on the biotransformation of 1 ppm cis-1,2-dichloroethylene (10.3 umol/kg) in methanogenic microcosms.

| | Concentration in sample microcosms after 4 months (umol/kg) | | |
|---|---|---|---|
| | cis-DCE | VC | Ethylene+ |
| Acetate | 6.87 | nd | nd |
| Butyrate | 6.84 | trace[1,2] | nd |
| Laurate | 6.68 | trace[3] | nd |
| Methanol | 3.53 | 4.06 | trace |
| Ethanol | 6.90 | nd | nd |
| Butanol | 6.37 | nd | nd |
| Propylene glycol[4] | 6.96 | trace[2] | trace[2] |
| Glycerol[4] | 6.73 | nd | nd |
| Polyethylene glycol | 6.69 | nd | nd |
| Glucose | 6.68 | 0.423 | trace[3] |
| Sucrose | 6.95 | nd | nd |
| Glutamate[4] | 3.78 | 1.55 | 3.21 |
| AC Broth[4] | trace | 4.16 | 5.88 |
| Killed Control | 7.58 | nd | nd |

[1]Quantitation limits as follows (umol/kg): cis-DCE, 0.10; VC, 0.16; and Ethylene, 0.18. Trace concentrations were measurable, but below the quantitation limit.
[2]Concentration measured after 2 months of incubation.
[3]Concentration measured after 3 months of incubation.
[4]Biotransformation enhancing agent of this invention.

It is to be understood that while specific forms and teachings of this invention are illustrated and described herein above, this invention is not to be limited thereto.

What is claimed is:

1. A method for enhancing the anaerobic biotransformation of at least one halogenated organic compound in an aqueous soil environment through stimulation of naturally occurring anaerobic bacteria in the environment, comprising the step of: adding an agent selected from the group consisting of (a) propylene glycol, (b) glycerol, (c) glutamate, (d) an aqueous mixture containing two percent proteose peptone, three tenth percent beef extract, three tenths percent yeast extract, three tenths percent malt extract, five tenths percent dextrose and two hundredths percent ascorbic acid and (e) mixtures of (a)–(d) in any combination thereof to at least a portion of the environment to produce an environment treated with the agent effective in this step to enhance the anaerobic biotransformation of the at least one halogenated organic compound to homologs of the at least one halogenated organic compound selected from the group consisting of mono halogenated homologs and nonhalogenated homologs.

2. The method of claim 1, wherein the amount of the agent is sufficient to decrease the half-life of the halogenated organic compound in the environment treated with the agent by a factor of at least two.

3. The method of claim 1, wherein the mole ratio of the agent to the halogenated organic compound ranges from 0.1/1 to 100/1 respectively in the environment treated with the agent.

4. The method of claim 1, in an aqueous soil environment which lacks a desirable indigenous naturally occurring anaerobic bacteria, further comprising the step of adding desirable anaerobic bacteria to at least a portion of the environment treated with the agent.

5. The method of claim 1, wherein the halogenated organic compound is selected from the group consisting of perchloroethylene, trichloroethylene and cis-dichloroethylene.

6. A method for enhancing the anaerobic biotransformation of at least one halogenated organic compound in water from an aqueous soil environment through stimulation of anaerobic bacteria, comprising the steps of:

(a) adding an agent selected from the group consisting of (i) propylene glycol, (ii) glycerol, (iii) glutamate, (iv) an aqueous mixture containing two percent proteose peptone, three tenth percent beef extract, three tenths percent yeast extract, three tenths percent malt extract, five tenths percent dextrose and two hundredths percent ascorbic acid and (v) mixtures of (i)–(iv) in any combination thereof to the water to produce an enriched water; and (b) contacting the enriched water with a bacteria capable of biotransforming the halogenated organic compound to produce a treated water effective in this step to enhance the anaerobic biotransformation of the at least one halogenated organic compound to homologs of the at least one halogenated organic compound selected from the group consisting of mono halogenated homologs and nonhalogenated homologs.

7. The method of claim 6, wherein the amount of the agent is sufficient to decrease the half-life of the halogenated organic compound by a factor of at least two.

8. The method of claim 6, wherein the mole ratio of the agent to the halogenated organic compound ranges from 0.1/1 to 100/1 respectively in the enriched water.

9. The method of claim 6, wherein the halogenated organic compound is selected from the group consisting of perchloroethylene, trichloroethylene and cis-dichloroethylene.

* * * * *